US012257687B2

(12) United States Patent
Levand et al.

(10) Patent No.: US 12,257,687 B2
(45) **Date of Patent: *Mar. 25, 2025**

(54) FOLDING TOOL

(71) Applicant: THE SHERWIN-WILLIAMS COMPANY, Cleveland, OH (US)

(72) Inventors: Victor J. Levand, Lyndhurst, OH (US); Sharad Gaurav, Lakewood, OH (US); Sarah B. Mulroy, Rocky River, OH (US); Joshua R. Robertson, North Ridgeville, OH (US); Edward Ray Goodwin, Jr., Westlake, OH (US); Randi Boss, Avon Lake, OH (US); Michael C. Lambertson, Jr., Aurora, OH (US)

(73) Assignee: SWIMC LLC, Cleveland, OH (US)

( * ) Notice: Subject to any disclaimer, the term of this patent is extended or adjusted under 35 U.S.C. 154(b) by 467 days.

This patent is subject to a terminal disclaimer.

(21) Appl. No.: 17/678,185

(22) Filed: Feb. 23, 2022

(65) Prior Publication Data

US 2022/0176536 A1 Jun. 9, 2022

Related U.S. Application Data

(63) Continuation of application No. 16/669,981, filed on Oct. 31, 2019, now Pat. No. 11,292,117, which is a (Continued)

(51) Int. Cl.
*B25F 1/04* (2006.01)
*B08B 1/16* (2024.01)
(Continued)

(52) U.S. Cl.
CPC ................ *B25F 1/04* (2013.01); *B08B 1/165* (2024.01); *B25F 1/006* (2013.01); *B25G 1/08* (2013.01);
(Continued)

(58) Field of Classification Search
CPC . B25F 1/04; B25F 1/006; B08B 1/165; B25G 1/08; B25G 3/32; B26B 11/006;
(Continued)

(56) References Cited

U.S. PATENT DOCUMENTS

| | | | |
|---|---|---|---|
| 65,114 | A | 5/1867 | Perkins |
| 98,949 | A | 1/1870 | Gerelds |

(Continued)

FOREIGN PATENT DOCUMENTS

| | | | |
|---|---|---|---|
| CA | 2437666 | A1 | 2/2005 |
| CN | 1205935 | A | 1/1999 |

(Continued)

OTHER PUBLICATIONS

Office Action from corresponding Chinese Application No. 202111351117.0 mailed on Apr. 18, 2024, 23 pages with translation.

*Primary Examiner* — Eric J Rosen
*Assistant Examiner* — Robert C Moore
(74) *Attorney, Agent, or Firm* — Tucker Ellis LLP

(57) ABSTRACT

Provided is a tool that includes a handle assembly including a top portion and a bottom portion. The tool also includes a lock plate disposed between the top and bottom portions and having a deflectable arm having a free end biased towards the top portion, a fixed end opposite the free end, an inner edge, an outer edge, and a detent near the free end and the inner edge. The tool additionally includes a blade having first and second ends, an indent in a bottom surface of the blade near the first end for engaging the detent in a closed position, and a ramp on the bottom surface near the indent defining a reduced thickness portion of the blade that reduces in thickness from the indent towards an edge of the blade to reduce contact between the detent and the blade during rotation of the blade.

19 Claims, 16 Drawing Sheets

Related U.S. Application Data continuation of application No. 15/871,605, filed on Jan. 15, 2018, now Pat. No. 10,493,613, which is a continuation of application No. 15/427,003, filed on Feb. 7, 2017, now Pat. No. 9,908,231.

(60) Provisional application No. 62/292,568, filed on Feb. 8, 2016.

(51) Int. Cl.

| | |
|---|---|
| ***B25F 1/00*** | (2006.01) |
| ***B25G 1/08*** | (2006.01) |
| ***B25G 3/14*** | (2006.01) |
| ***B25G 3/26*** | (2006.01) |
| ***B25G 3/32*** | (2006.01) |
| ***B26B 11/00*** | (2006.01) |
| ***B44D 3/00*** | (2006.01) |
| ***E04F 21/165*** | (2006.01) |

(52) U.S. Cl.

CPC ................. *B25G 3/14* (2013.01); *B25G 3/26* (2013.01); *B25G 3/32* (2013.01); *B26B 11/001* (2013.01); *B26B 11/006* (2013.01); *B44D 3/006* (2013.01); *E04F 21/165* (2013.01)

(58) Field of Classification Search

CPC ... B26B 1/02; B26B 1/04; B44D 3/006; E04F 21/165

USPC .............................................................. 7/155

See application file for complete search history.

(56) References Cited

U.S. PATENT DOCUMENTS

| | | | | |
|---|---|---|---|---|
| 929,194 | A | | 7/1909 | Compton |
| 1,552,361 | A | | 9/1925 | Trombley |
| 2,092,586 | A | | 9/1937 | Naumovich |
| 2,615,247 | A | | 6/1950 | Waters |
| 5,210,925 | A | | 5/1993 | Morgulis |
| 5,251,352 | A | | 10/1993 | Cullison |
| D345,289 | S | | 3/1994 | Sakai |
| D347,374 | S | | 5/1994 | Sakai |
| D347,375 | S | | 5/1994 | Sakai |
| D348,599 | S | | 7/1994 | Sakai |
| D356,723 | S | | 3/1995 | Sakai |
| 5,450,670 | A | | 9/1995 | Sakai |
| D367,599 | S | | 3/1996 | Sakai |
| 5,528,834 | A | | 6/1996 | Seber et al. |
| 5,537,750 | A | | 7/1996 | Seber et al. |
| 5,581,834 | A | | 12/1996 | Collins |
| D399,621 | S | | 10/1998 | Henke |
| 5,822,867 | A | | 10/1998 | Sakai |
| 5,870,786 | A | | 2/1999 | Papadopoulos |
| 5,884,347 | A | | 3/1999 | Yurchision et al. |
| 5,887,347 | A | | 3/1999 | Gibbs |
| 5,956,788 | A | | 9/1999 | Henke |
| 5,959,058 | A | | 9/1999 | Tonelli et al. |
| 5,964,035 | A | | 10/1999 | Poehlmann |
| 5,979,056 | A | | 11/1999 | Andrews |
| 5,979,058 | A | | 11/1999 | Henke |
| 6,006,384 | A | | 12/1999 | Toal |
| 6,009,581 | A | * | 1/2000 | Davis ..................... B44D 3/164 7/105 |
| 6,131,222 | A | | 10/2000 | Anderson et al. |
| 6,182,317 | B1 | | 2/2001 | Huang |
| 6,279,434 | B1 | | 8/2001 | Brown |
| 6,530,098 | B1 | | 3/2003 | Gringer et al. |
| 6,594,906 | B1 | | 7/2003 | Sakai et al. |
| 6,826,836 | B1 | | 12/2004 | Lin |
| 6,836,967 | B1 | | 1/2005 | Sakai |
| D535,541 | S | | 1/2007 | Holby |
| D562,517 | S | | 2/2008 | Henke et al. |
| D564,583 | S | | 3/2008 | Windorski |
| D581,764 | S | | 12/2008 | Kinskey et al. |
| 7,603,778 | B1 | | 10/2009 | Lerch |
| D629,578 | S | | 12/2010 | Molina |
| 8,291,597 | B2 | | 10/2012 | Hawk et al. |
| 8,464,382 | B2 | | 6/2013 | Chu |
| 8,490,288 | B1 | | 7/2013 | Mollick et al. |
| D693,077 | S | | 11/2013 | Thompson |
| 8,832,943 | B2 | | 9/2014 | Sakai |
| D733,517 | S | | 7/2015 | Constantine |
| 9,315,369 | B2 | | 4/2016 | Wang |
| 9,352,473 | B2 | | 5/2016 | Harvey |
| D760,049 | S | | 6/2016 | Levand |
| 9,492,916 | B2 | | 11/2016 | Snyder et al. |
| 9,592,612 | B2 | | 3/2017 | Koenig |
| 9,908,231 | B2 | * | 3/2018 | Levand .................. B25F 1/006 |
| 10,040,185 | B2 | | 8/2018 | Davis |
| 10,493,613 | B2 | * | 12/2019 | Levand .................. B44D 3/006 |
| 11,292,117 | B2 | * | 4/2022 | Levand .................... B25G 3/14 |
| 2002/0073554 | A1 | | 6/2002 | Chen |
| 2003/0019108 | A1 | | 1/2003 | McHenry |
| 2006/0230620 | A1 | | 10/2006 | Steigerwalt et al. |
| 2007/0017101 | A1 | | 1/2007 | Perez et al. |
| 2008/0086822 | A1 | | 4/2008 | Elsener |
| 2008/0110027 | A1 | | 5/2008 | Seber et al. |
| 2008/0110028 | A1 | * | 5/2008 | Seber ........................ B26B 5/00 30/152 |
| 2009/0084233 | A1 | | 4/2009 | Rosso et al. |
| 2009/0255127 | A1 | * | 10/2009 | Seymour ................... B26B 5/00 30/161 |
| 2010/0192381 | A1 | | 8/2010 | Sakai |
| 2011/0107603 | A1 | | 5/2011 | Giuntoli et al. |
| 2012/0137445 | A1 | | 6/2012 | Arvinte et al. |
| 2012/0144678 | A1 | | 6/2012 | Chen |
| 2013/0227794 | A1 | * | 9/2013 | Wang ........................ B67B 7/20 7/118 |
| 2017/0025314 | A1 | | 8/2017 | Levand |
| 2018/0029213 | A1 | | 2/2018 | Li |
| 2018/0141201 | A1 | | 5/2018 | Levand et al. |

FOREIGN PATENT DOCUMENTS

| | | | |
|---|---|---|---|
| CN | 2468677 | Y | 1/2002 |
| CN | 2933719 | Y | 8/2007 |
| CN | 201456016 | U | 5/2010 |
| CN | 201534327 | U | 7/2010 |
| CN | 202934548 | U | 5/2013 |
| CN | 104626031 | A | 5/2015 |
| CN | 204450467 | U | 7/2015 |
| CN | 204585164 | U | 8/2015 |
| DE | 202015100384 | U1 | 5/2015 |
| GB | 2274615 | A | 8/1994 |
| GB | 2482945 | A | 2/2012 |
| WO | 2001072481 | A1 | 10/2001 |

* cited by examiner

FOLDING TOOL

RELATED APPLICATION

This application is a continuation of U.S. patent application Ser. No. 16/669,981 filed on Oct. 31, 2019, which is a continuation of U.S. patent application Ser. No. 15/871,605 filed on Jan. 15, 2018, which is a continuation of U.S. patent application Ser. No. 15/427,003 filed on Feb. 7, 2017, which claims priority to and the benefit of U.S. Provisional Application Ser. No. 62/292,568 filed on Feb. 8, 2016. The entirety of which are incorporated herein by reference.

BACKGROUND

Painters and drywallers use a variety of tools to perform a variety of tasks while painting and drywalling. Switching between the various tools wastes time and added space is required to store such tools. To save time and space, a single tool can be provided for painters and drywallers that enables the painter/drywaller to perform the variety of tasks. For example, a single tool can be provided for cleaning a paint roller, scraping paint, cleaning cracks, working putty, and opening paint cans.

TECHNICAL FIELD

Embodiments of the subject matter disclosed herein relate to a tool, and more particularly to a multi-purpose folding tool.

BRIEF DESCRIPTION

In an embodiment, a tool is provided that includes a handle assembly including a top portion having first and second ends and a bottom portion having first and second ends. The tool also includes a lock plate disposed between the top and bottom portions and having first and second ends, a deflectable arm having a free end biased towards the top portion, a fixed end opposite the free end, an inner edge, an outer edge, and a detent near the free end and the inner edge. The tool additionally includes a blade disposed between the top portion and the lock plate where a top surface of the blade abuts a bottom surface of the top portion and a bottom surface of the blade abuts a top surface of the lock plate. The blade has first and second ends, an indent in the bottom surface near the first end for engaging the detent in a closed position, and a ramp on the bottom surface near the indent defining a reduced thickness portion of the blade that reduces in thickness from the indent towards an edge of the blade to reduce contact between the detent and the blade during rotation of the blade. The blade is rotatable about the first end between the closed positioned where the second end of the blade is held within the handle assembly by the deflectable arm, and an open position where the second end of the blade is outside the top and bottom portions and the first end of the blade is engaged by the free end of the deflectable arm to hold the blade in the open position.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
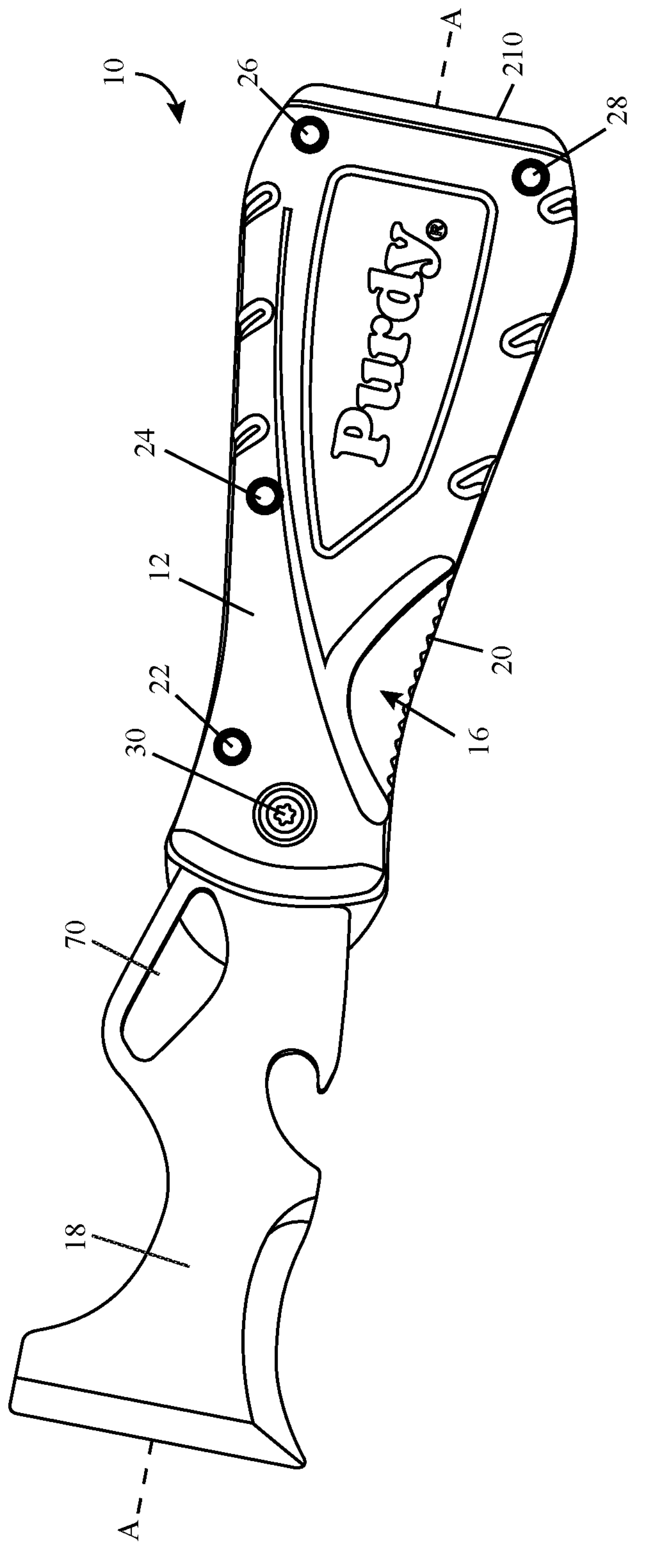
FIG. 1 is a perspective view of a folding tool in an open position.
Figure 2:
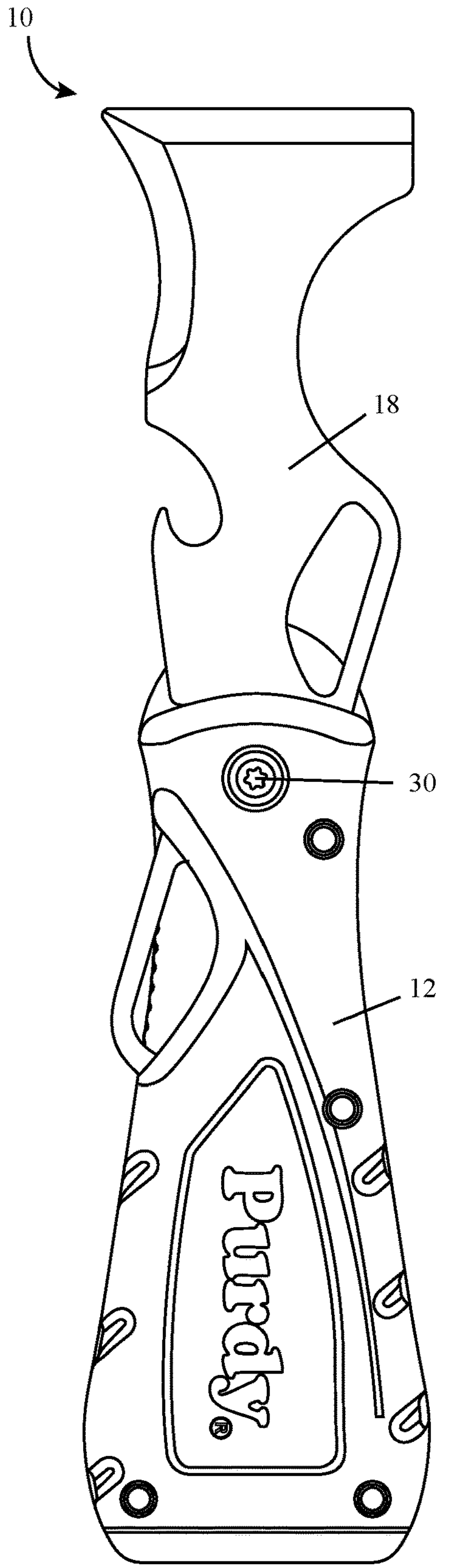
FIG. 2 is front view of the folding tool in an open position.
Figure 3:
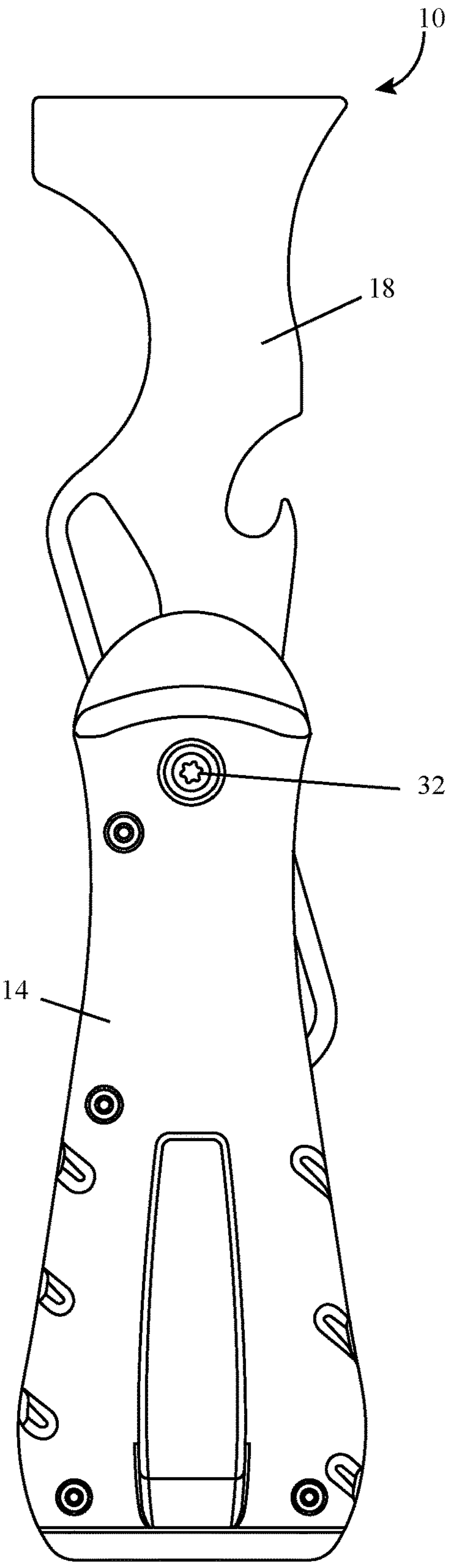
FIG. 3 is a rear view of the folding tool in an open position.
Figure 4:
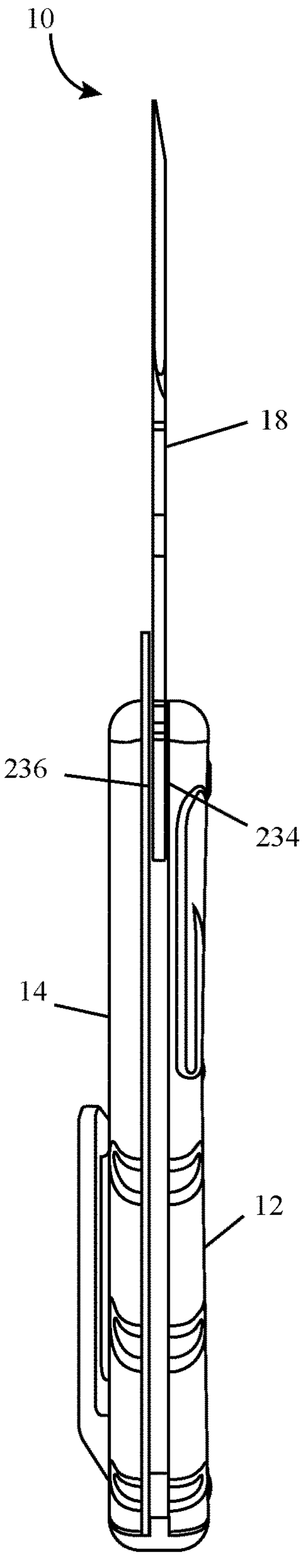
FIG. 4 is a left side view of the folding tool in an open position.
Figure 5:
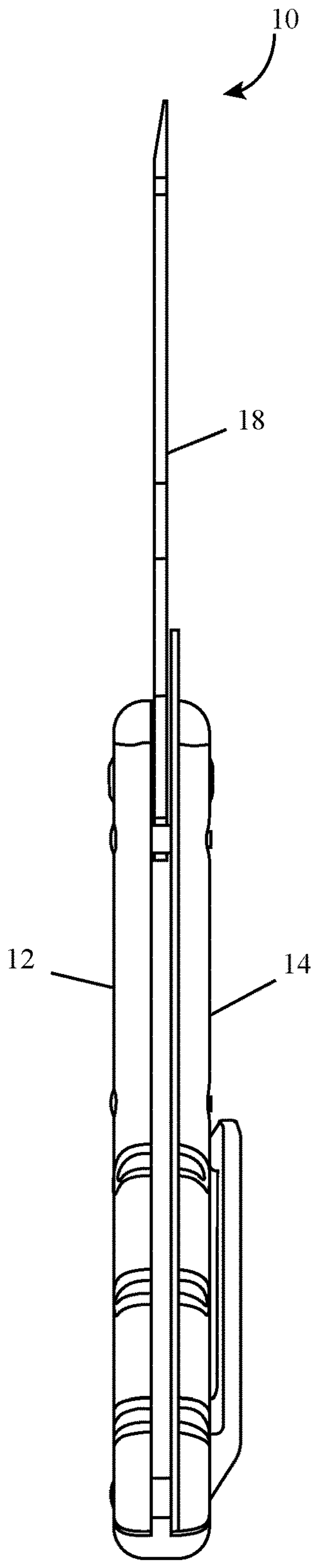
FIG. 5 is a right side view of the folding tool in an open position.
Figure 6:
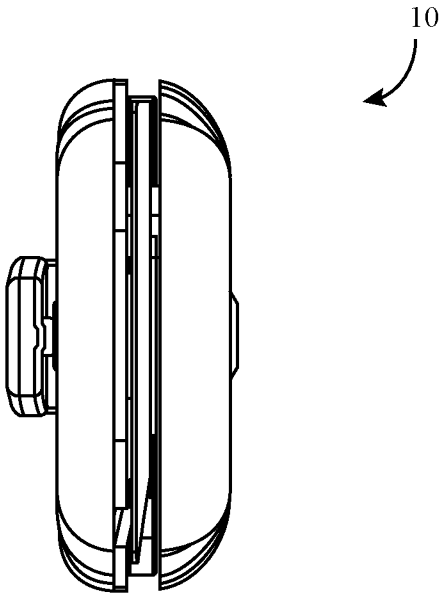
FIG. 6 is a top view of the folding tool in an open position.
Figure 7:
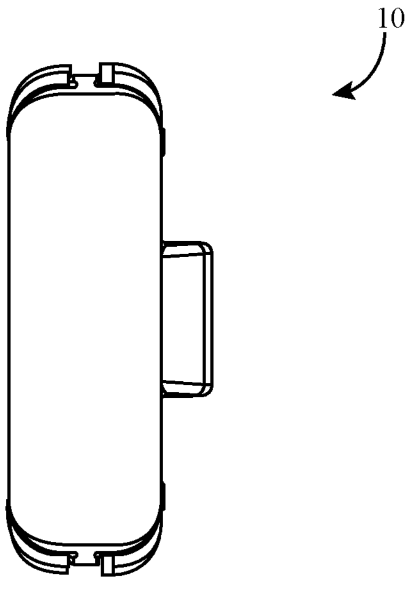
FIG. 7 is a bottom view of the folding tool in an open position.
Figure 8:
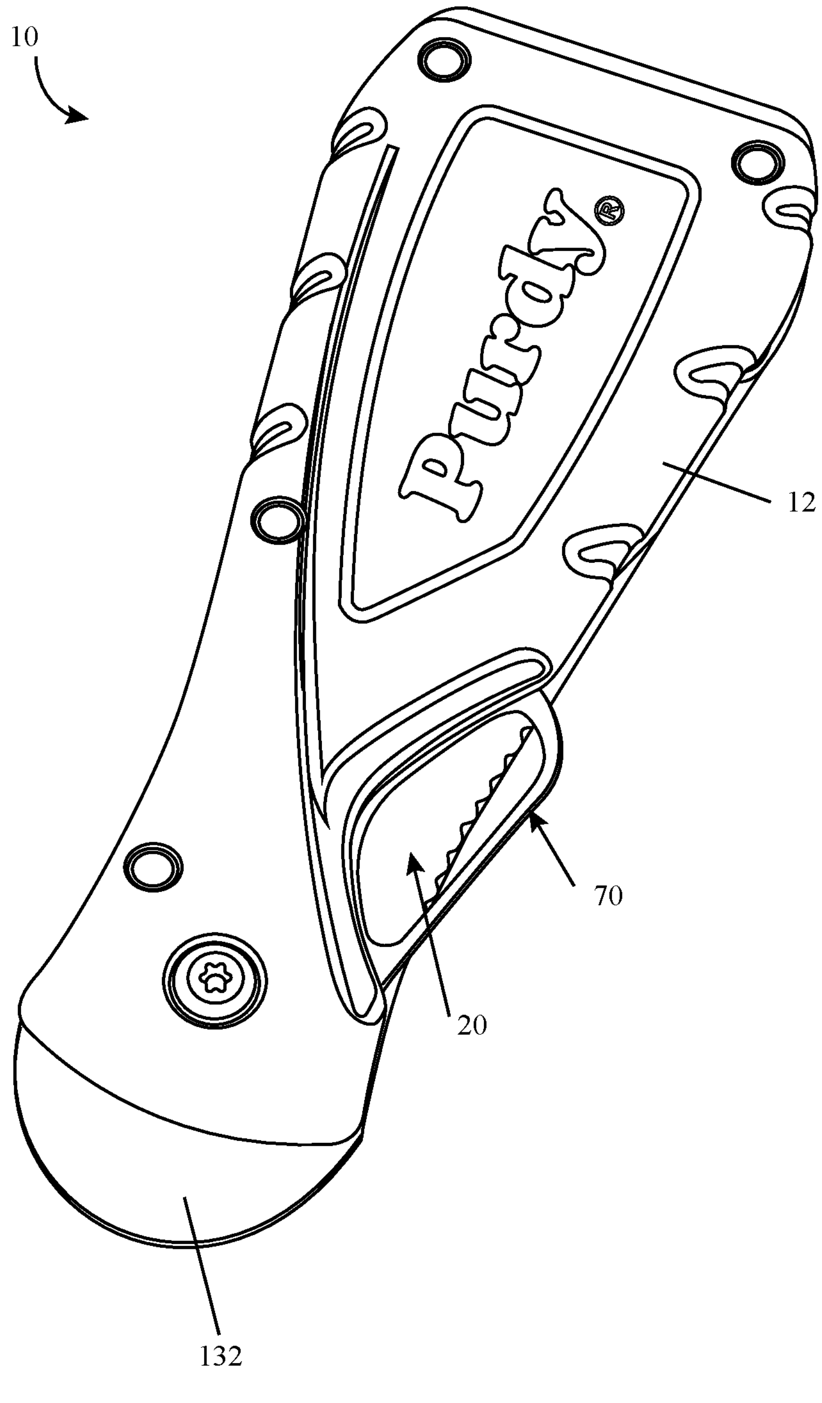
FIG. 8 is perspective view of the folding tool in a closed position.
Figure 9:
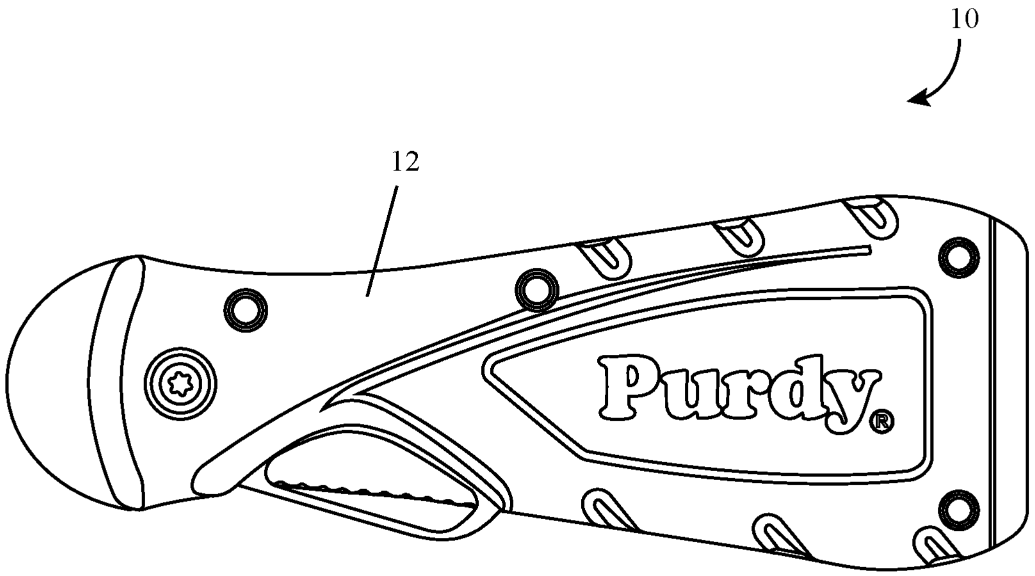
FIG. 9 is front view of the folding tool in a closed position.
Figure 10:
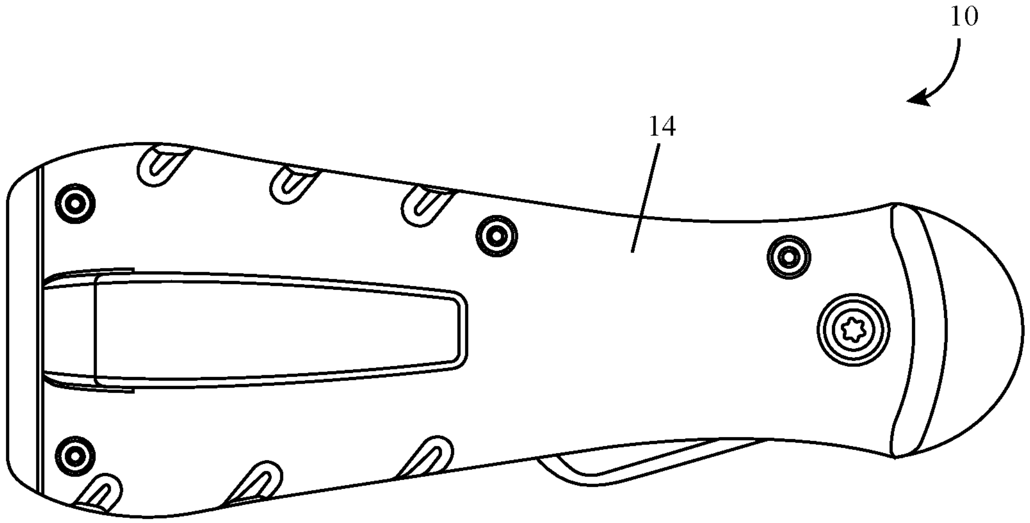
FIG. 10 is a rear view of the folding tool in a closed position.
Figure 11:
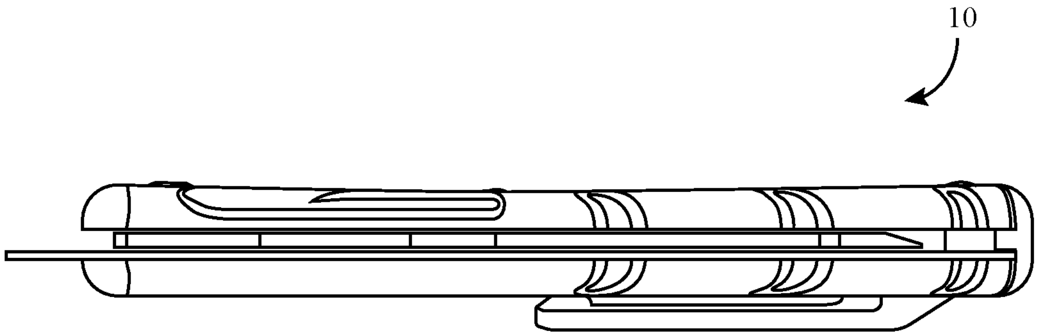
FIG. 11 is a left side view of the folding tool in a closed position.
Figure 12:
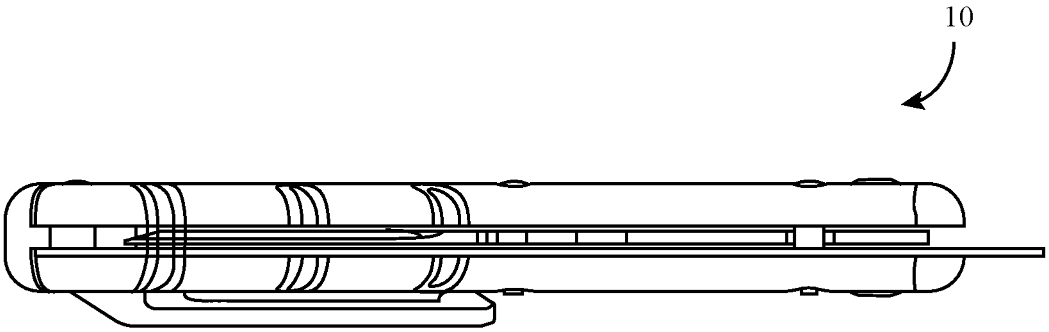
FIG. 12 is a right side view of the folding tool in a closed position.
Figure 13:
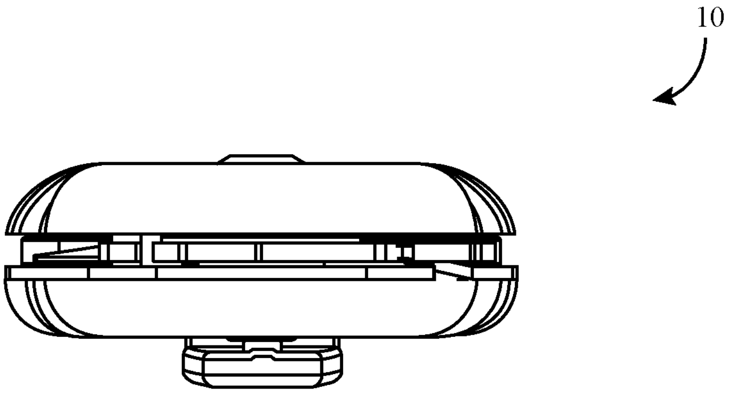
FIG. 13 is a top view of the folding tool in a closed position.
Figure 14:
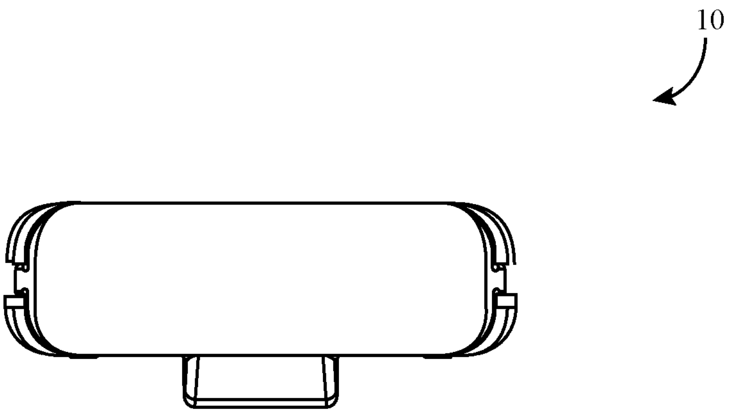
FIG. 14 is a bottom view of the folding tool in a closed position.

Embodiments of the provided subject matter relate to a tool having a blade with an indent in a bottom surface thereof near its first end for engaging a detent on a deflectable arm in a closed position. The blade also includes and a ramp on its bottom surface near the indent defining a reduced thickness portion of the blade that reduces in thickness from the indent towards an edge of the blade to reduce contact between the detent and the blade during rotation of the blade.

With reference to the drawings, like reference numerals designate identical or corresponding parts throughout the several views. However, the inclusion of like elements in different views does not mean a given embodiment necessarily includes such elements or that all embodiments of the invention include such elements.

Referring to FIGS. 1-14, a tool, such as a folding multi-purpose tool is illustrated at reference numeral 10. The folding tool 10 can be used during painting and drywalling, for example, to scrape paint, clean cracks, spread compound, clean rollers, remove putty, open a paint lid, open a bottle, open cracks, set nails, cut, install and remove flush mounted cover plates, etc. The folding tool includes a longitudinal axis A-A and a handle assembly including two outer portions, a top portion 12 and a bottom portion 14 that form a substantially trapezoidal tool. Sandwiched between the top and bottom portions 12 and 14 are a lock plate 16 and a blade 18. In an embodiment, the lock plate 16 abuts the bottom portion 14 and the blade 18 abuts the top portion 12 when in a closed position.

The lock plate 16 includes a deflectable arm 20 that is biased in a first position in FIG. 1 to prevent movement of the blade 18 from an open position (shown in FIGS. 1-7) to the closed position (shown in FIGS. 8-14). The deflectable arm 20 is movable to a second position to allow movement of the blade 18 from the open position to the closed position, and to an intermediate position (FIG. 29) to assist in restricting movement of the blade 18 when the blade 18 is in the closed position.

By way of example and not limitation, the coupling between the top portion 12, bottom portion 14, and lock plate 16, among others can be a screw, a bolt and nut, a rivet, a male and female coupling of elements, among others. For example, the top portion 12, bottom portion 14, and lock plate 16 may each include a plurality of openings, discussed in more detail below, for receiving rivets 22, 24, 26, and 28 to couple the components together. The top portion 12, bottom portion 14, lock plate 16, and blade 18 may each also include a pivot opening, discussed in more detail below, for receiving a pivot formed by first and second coupling screws 30 and 32 that couple the components together and allow the blade 18 to pivot relative to the top portion 12, bottom portion 14, and lock plate 16.

Figure 15:
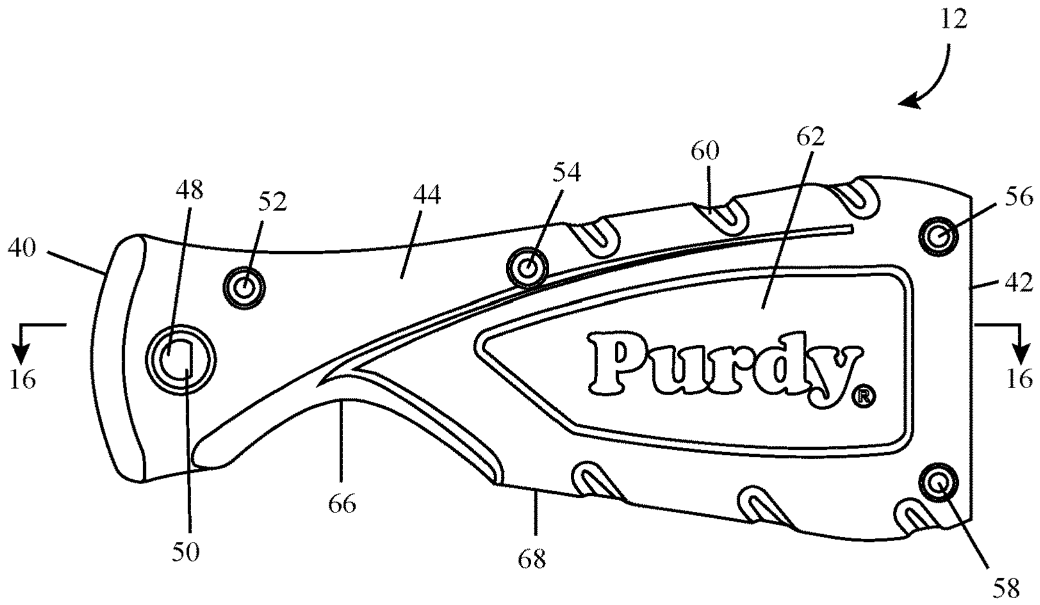
FIG. 15 is a front view of a top portion of the folding tool.
Figure 16:
FIG. 16 is a cross-sectional view taken about line 16-16 in FIG. 15.
Figure 17:
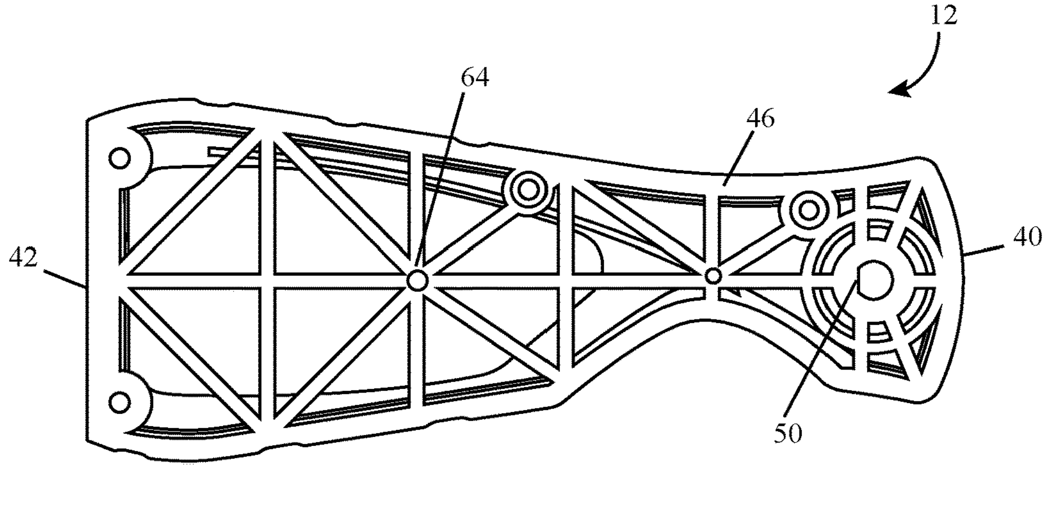
FIG. 17 is a rear view of the top portion.

Referring now to FIGS. 15-17 and the top portion 12 in detail, the top portion 12 of the handle assembly has first and second ends 40 and 42 spaced along the axis, an outer surface 44, and an inner surface 46. The top portion 12 includes a pivot opening 48 at the first end 40 that has a flat 50 for aligning with a corresponding flat on the coupling screw 32 to prevent rotation of the screw 32, and a plurality of rivet openings 52, 54, 56, and 58 spaced along the top portion 12 for receiving the rivets 22, 24, 26, and 28 respectively. The opening 48 can be countersunk to receive the head of the coupling screw 30. By way of example and not limitation, the rivet opening 52 is near the first end 40, the rivet opening 54 is near a middle of the top portion 12, and the rivet openings 56 and 58 are near the second end 42. The rivet openings are provided near edges of the top portion 12 to prevent interference with the blade 18.

The top portion 12 also includes a plurality of grip areas 60 on the outer surface 44 in the form of indentations for a user to grip, an area 62 on the outer surface 44 for indicia, a support structure 64 extending throughout the inner surface 46 for strength, and a notch 66 extending inwardly from a side 68 of the top portion 12 to expose the deflectable arm 20 and a loop 70 (FIG. 1) of the blade 18. The notch 66 allows the user to engage the loop 70 without interference by the top portion 12 to move the blade 18 from the closed position to the open position, and allows the user to move the deflectable arm 20 to the second position to move the blade 18 from the open position to the closed position.

Figure 18:
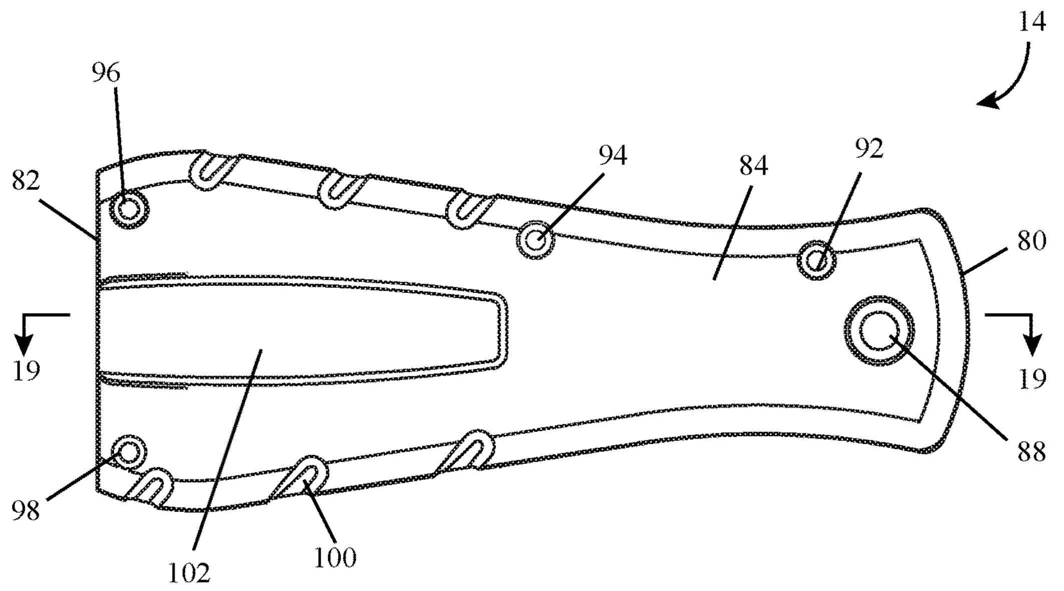
FIG. 18 is a front view of a bottom portion of the folding tool.
Figure 19:
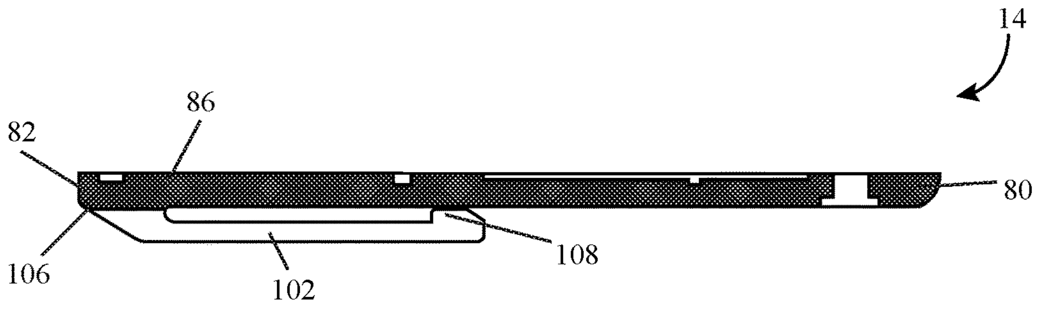
FIG. 19 is a cross-sectional view taken about line 19-19 in FIG. 18.
Figure 20:
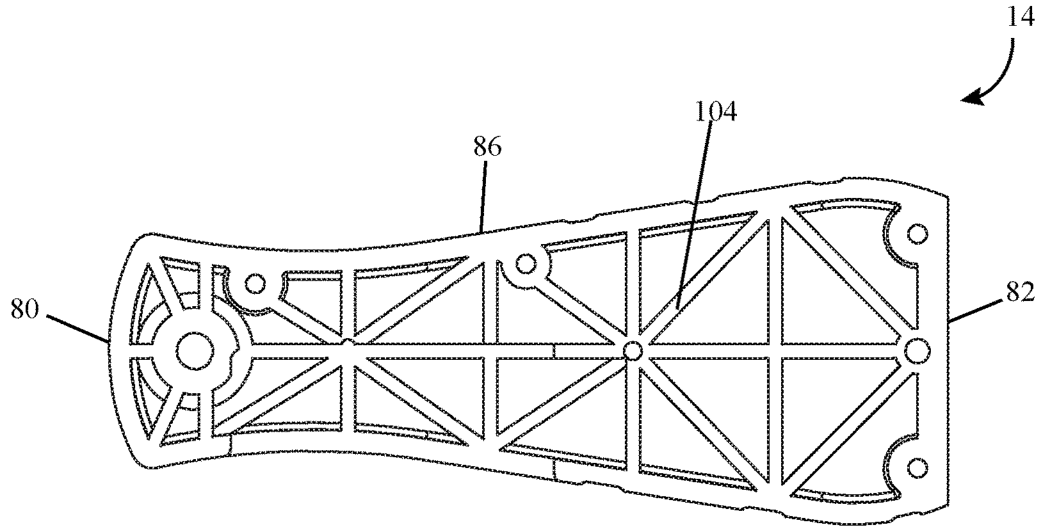
FIG. 20 is a rear view of the bottom portion.

Referring now to FIGS. 18-20 and the bottom portion 14 in detail, the bottom portion 14 of the handle assembly has first and second ends 80 and 82 spaced along the axis, an outer surface 84, and an inner surface 86. The bottom portion 14 includes a pivot opening 88 at the first end 80 for receiving the screw 32, and a plurality of rivet openings 92, 94, 96, and 98 spaced along the bottom portion 14 for receiving the rivets 22, 24, 26, and 28 respectively. The pivot opening 88 can be countersunk to receive the head of the coupling screw 32. By way of example and not limitation, the rivet opening 92 is near the first end 80, the rivet opening 94 is near a middle of the bottom portion 14, and the rivet openings 96 and 98 are near the second end 82. The rivet openings are provided near edges of the bottom portion 14 to prevent interference with the blade 18.

The bottom portion 14 also includes a plurality of grip areas 100 on the outer surface 84 in the form of indentations for a user to grip, a clip 102 integrally formed with the outer surface 84 for clipping to a pocket or a belt for example, and a support structure 104 extending throughout the inner surface 86 for strength. The clip has a fixed end 106 formed with the bottom portion 14 and a free end 108 that can be deflected away from the bottom portion 14.

The top and bottom portions 12 and 14 may be made of any suitable material, such as a polymer composite, and may be formed in any suitable manner, such as injection molding. In an embodiment, the polymer composite includes nylon reinforced with fiberglass, such as between ten to twenty percent fiberglass.

Figure 21:
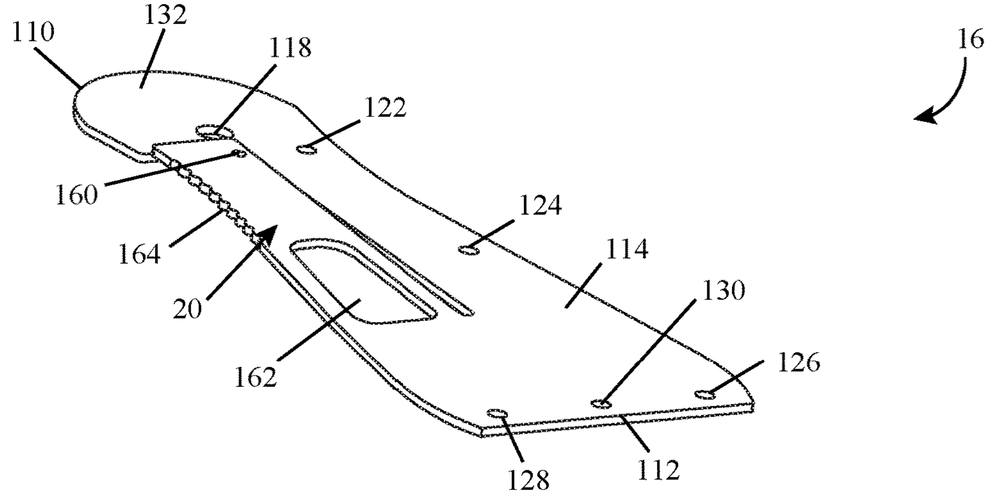
FIG. 21 is a perspective view of a lock plate of the folding tool.
Figure 22:
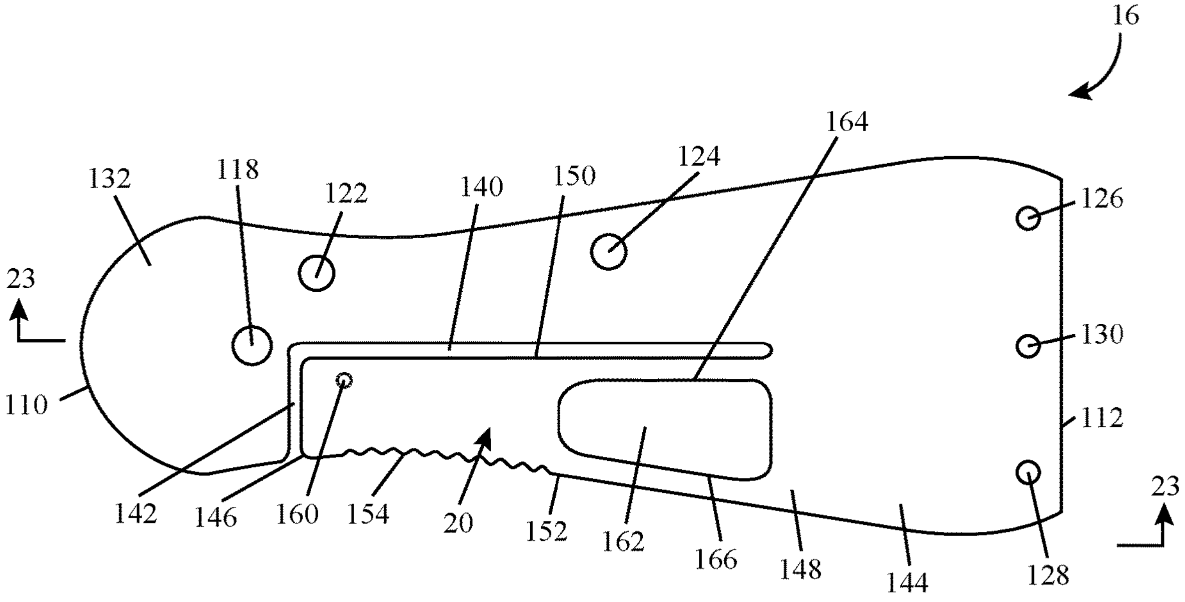
FIG. 22 is a front view of the lock plate.
Figure 23:
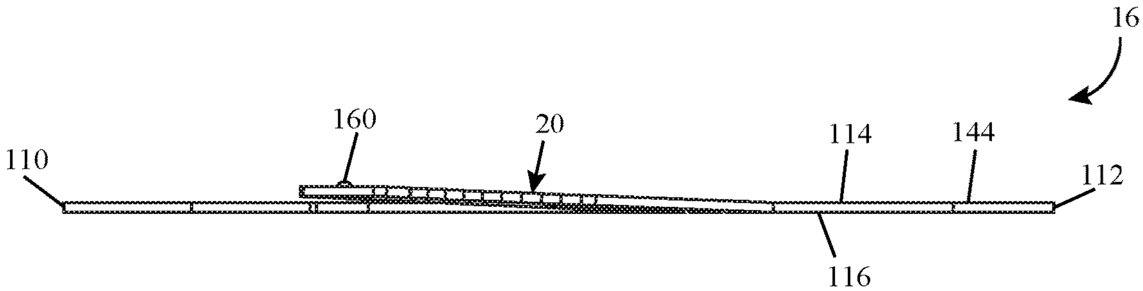
FIG. 23 is a cross-sectional view taken about line 23-23 in FIG. 22.

Referring now to FIGS. 21-23 and the lock plate 16 in detail, the lock plate 16 has first and second ends 110 and 112 spaced along the axis, a top surface 114, and a bottom surface 116. The lock plate 16 includes a pivot opening 118 at the first end 110 for receiving the screw 32, and a plurality of rivet openings 122, 124, 126, and 128 spaced along the lock plate 16 for receiving the rivets 22, 24, 26, and 28 respectively. By way of example and not limitation, the rivet opening 122 is near the first end 110, the rivet opening 124 is near a middle of the lock plate 16, and the rivet openings 126 and 128 are near the second end 112. The rivet openings are provided near edges of the lock plate 16 and aligned with the corresponding rivet openings in the top and bottom portions 12 and 14 to prevent interference with the blade 18.

The lock plate 16 also includes an opening 130 between the openings 126 and 128 near the second end 112 for receiving a protrusion 222 of a hammerhead 210 (FIG. 27) as discussed below, and a rounded portion 132 at the first end 110 that extends beyond the first ends 40 and 80 of the top and bottom portions 12 and 14. The rounded portion 132 can be used as a flathead screwdriver and/or as an opener for a lid on a paint can for example.

The lock plate 16 is substantially trapezoidal in shape and sized substantially similar to the top and bottom portions 12 and 14 except for the rounded portion 132. The lock plate 16 has a substantially L-shaped cutout having a cutout portion 140 extending axially near a middle of the lock plate 16 and a cutout portion 142 extending perpendicular to the axis and opening to an outside of the lock plate 16. The cutout portion 140 has a length longer than a length of the cutout portion 142. In an embodiment the length of the cutout portion 140 is more than twice the length of the cutout portion 142, and in another embodiment more than three times the length. The cutout separates the lock plate 16 into a body portion 144 and the deflectable arm 20. The lock plate 16 may be one-piece formed in any suitable manner, such as by stamping, or may be formed as multiple pieces connected in a suitable manner.

The deflectable arm 20 includes a first end 146 being a free end spaced from the body portion 144 by the cutout portion 142, a second end 148 being a fixed end integrally formed with the body portion 144, an inner edge 150 spaced from the body portion 144 by the cutout portion 140, and an outer edge 152 that when the tool is assembled is substantially aligned with the corresponding edge of the bottom portion 14. The outer edge 152 includes a serrated region 154 extending along a portion of the outer edge 152 for a user to grip when moving the deflectable arm 20 between positions.

The deflectable arm 20 is biased in the first position where the free end 146 is above a plane of the body portion 144 such that the deflectable arm 20 forms an incline from the fixed end to the free end, and the deflectable arm 20 is deflectable to the second position during movement of the blade 18 where the deflectable arm 20 is substantially in the same plane as the body portion 144. The angle of incline of the deflectable arm 20 is sized to give a positive lock action in the first position when the blade is in the open position and to resist deflection if contacted by a user during operation, and to resist movement of the blade without an external force when the blade 18 is in the closed position. For example, the free end 146 may be raised above the top surface 114 and thus the body portion 144 approximately three millimeters.

The deflectable arm 20 also includes a detent 160, such as a detent ball spaced from the first end 146 and the inner edge 150, and an elongate opening 162 spaced from the inner and outer edges 150 and 152. The detent 160 extends upward from the deflectable arm perpendicular to the axis, for example approximate greater than five tenths of a millimeter and has a diameter of approximately one and eight tenths of a millimeter. The detent 160 is axially spaced form the first end 146 and spaced from the inner edge 150 so as to reduce the amount of contact between the detent and the blade 18 during movement between the open and closed positions. For example, the detent 160 may be spaced from the free end 146 approximately five millimeters.

The elongate opening 162 may be spaced from the inner and outer edges 150 and 152 to form two continuous regions of the deflectable arm 20 around the opening 162 to increase the strength of the deflectable arm 20 while distributing forces exerted on the deflectable arm. The elongate opening 162 may be provided at or near the second end 148 of the deflectable arm 20 and is longer in a direction from the fixed end 148 to the free end 146 than in a direction from the inner edge 150 to the outer edge 152. The elongate opening 162 has an inner edge 164 proximate and parallel to the inner edge 150, and an outer edge 166 proximate and parallel to the outer edge 152 such that the continuous regions maintain substantially constant widths.

Figure 24:
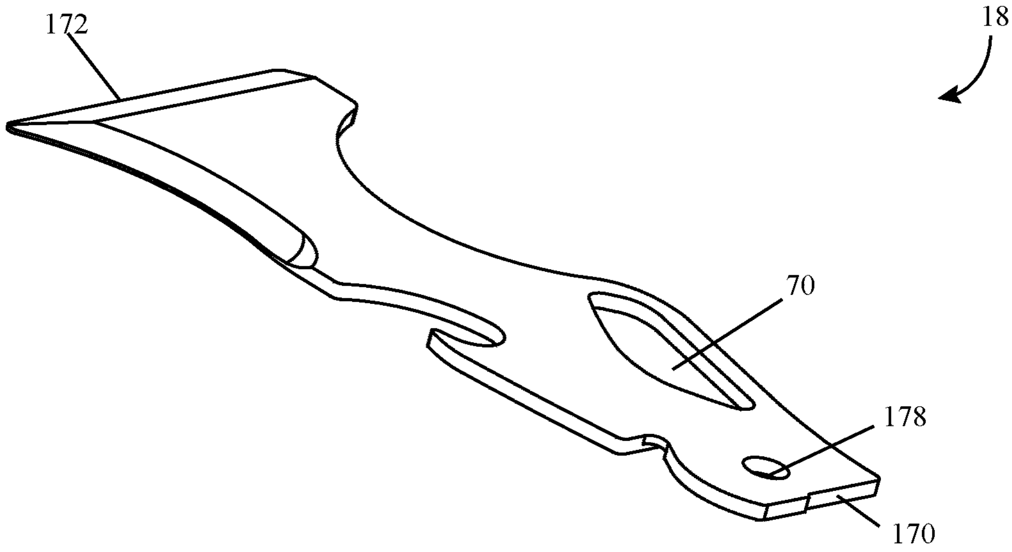
FIG. 24 is a perspective view of a blade of the folding tool.
Figure 25:
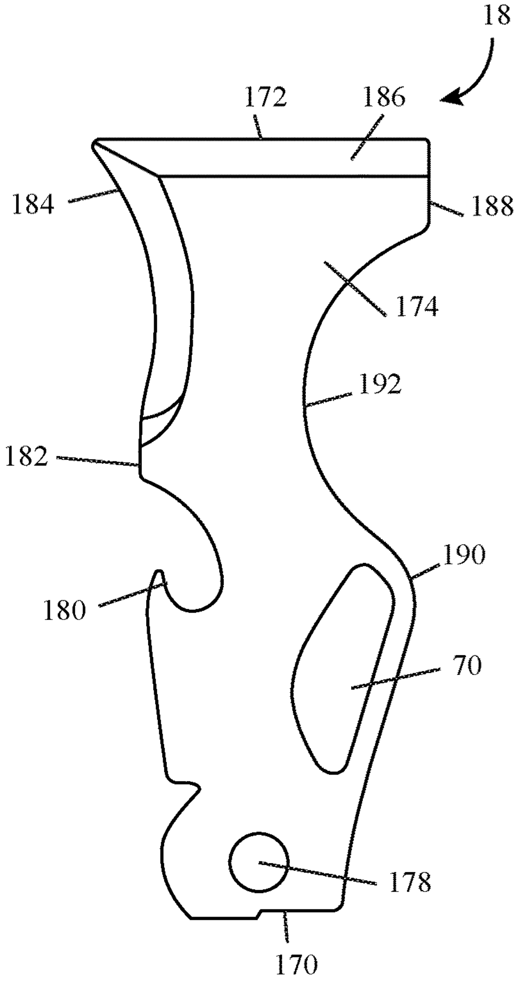
FIG. 25 is a front view of the blade.
Figure 26:
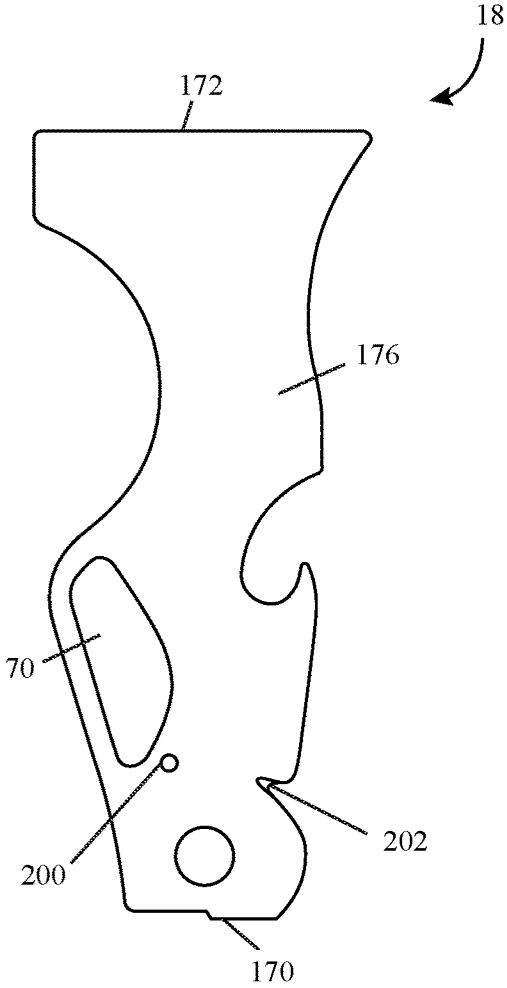
FIG. 26 is a rear view of the blade.

Referring now to FIGS. 24-26 and the blade 18 in detail, the blade 18, which may be any suitable shape made of any suitable material such as metal, has first and second ends 170 and 172 spaced along the axis, a top surface 174, and a bottom surface 176. The blade 18 includes a pivot opening 178 at the first end 170 for receiving the screw 32, a bottle opener 180 on a side 182, a cutter 184 on the side 182, a scraper and/or spreader 186 at the second end 172, a paint can opener 188 on a side 190, a roller cleaner 192 on the side 190, and the loop 70 inwardly spaced from the side 190 near the first end 170. The loop 70 and thus the side 184 angles outward from the first end 170 to allow the roller cleaner 192 in addition to surface 190 to be larger than on similarly sized tools. The scraper and/or spreader 186 may be any suitable width, such as one and three quarters of an inch.

The blade 18 also includes an indent 200 in the bottom surface 176 near the first end 170 for engaging the detent 160 of the lock plate 16 when the blade 18 is in the closed position, and a ramp 202 near the indent 200 that defines a reduced thickness portion of the blade 18 that reduces in thickness from the indent 200 towards the end 182. The indent 200 is spaced further from the opening 178 towards the second end 172 than other designs and closer to the side 182 reducing contact between the detent 160 and the bottom surface 176 of the blade 18 during movement. The ramp 202 also reduces contact between the bottom surface 176 of the blade 18 and the detent 160 during rotation of the blade 18 by causing the detent 160 to disengage from the blade 18 before reaching the side 182. This reduces wear to the blade 18 and the detent 160 thereby increasing the life of the folding tool 10. The indent 200 extends into the blade 18 in one example approximately one millimeter and has a diameter of approximate one and six tenths of a millimeter.

Figure 27:
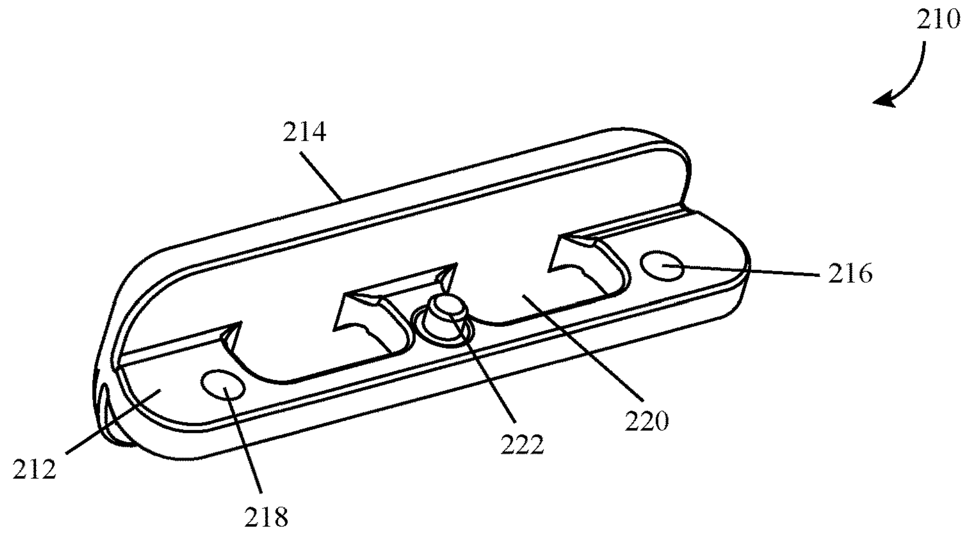
FIG. 27 is a perspective view of a hammerhead of the folding tool.
Figure 28:
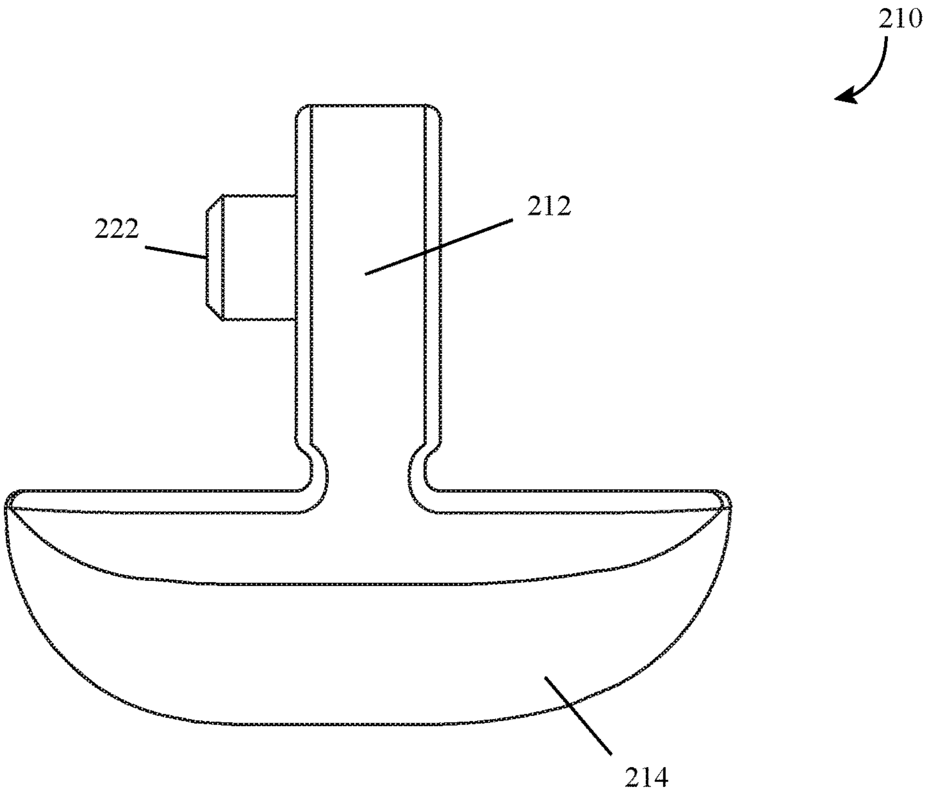
FIG. 28 is a left side view of the hammerhead.

Referring now to FIGS. 27 and 28, a hammerhead 210 is shown. The hammerhead 210 is substantially T-shaped having a first portion 212 disposed between the lock plate 16 and the top portion 12 and a second portion 214 perpendicular to the first portion 212 extending past the second ends 42 and 82 of the first and second portions 12 and 14 and abutting end faces thereof. The second portion 214 has a substantially flat surface that curves at the sides and ends and can be used as a hammerhead, for example for driving in nails. The first portion 212 includes rivet openings 216 and 218 for receiving rives 26 and 28 respectively, which are aligned with the corresponding rivet openings in the top and bottom portions 12 and 14 and the lock plate 16. The first portion 212 also includes a pair of cutouts 220 for reducing weight of the hammerhead 210, and a protrusion 222 projecting perpendicular to the first portion 212 parallel to the second portion 214 for engaging the opening 130 in the lock plate 16 to further secure the hammerhead 210.

To assemble the folding tool 10, the rivets 22, 24, 26 and 28 can be inserted through the respective openings 52, 54, 56, and 58 in the top portion 12. Optional rivet tubes 230 and 232 (FIG. 5) can be installed over the rivets 22 and 24 and the hammerhead 210 can be positioned so that the rivets 26 and 28 extend through the respective openings 216 and 218 in any order. The lock plate 16 can then be positioned so that the rivets 22, 24, 26, and 28 extend through the respective openings 122, 124, 126, and 128 and the protrusion 222 extends through the opening 130. The bottom portion 14 can then be positioned so that the rivets 22, 24, 26, and 28 extend through the respective openings 92, 94, 96 and 98. The rivets 22, 24, 26, and 28 can then be stamped, for example simultaneously in a press.

The blade 18 can then be inserted within the handle assembly until the opening 178 is aligned with openings 48, 88, and 118 and washers 234 and 236 are positioned on either side of the blade 18. The washers may be made of a suitable material, such as stainless steel for a high duty cycle, and the washer 234 may have a larger diameter than washer 236. The washer 234 may be positioned between the top surface 174 of the blade 18 and the bottom surface 46 of the top portion 14, and the washer 236 may be positioned between the bottom surface 176 of the blade 18 and the top surface 114 of the lock plate 16. The coupling screws 30 and 32 are then positioned in the openings 48, 88, 118 and 170 and coupled together, for example by tightening the screws together using a suitable tool such as a torque screwdriver, to hold the washers 234 and 236 and the blade 18 in the assembly while allowing the blade 18 to pivot.

Figure 29:
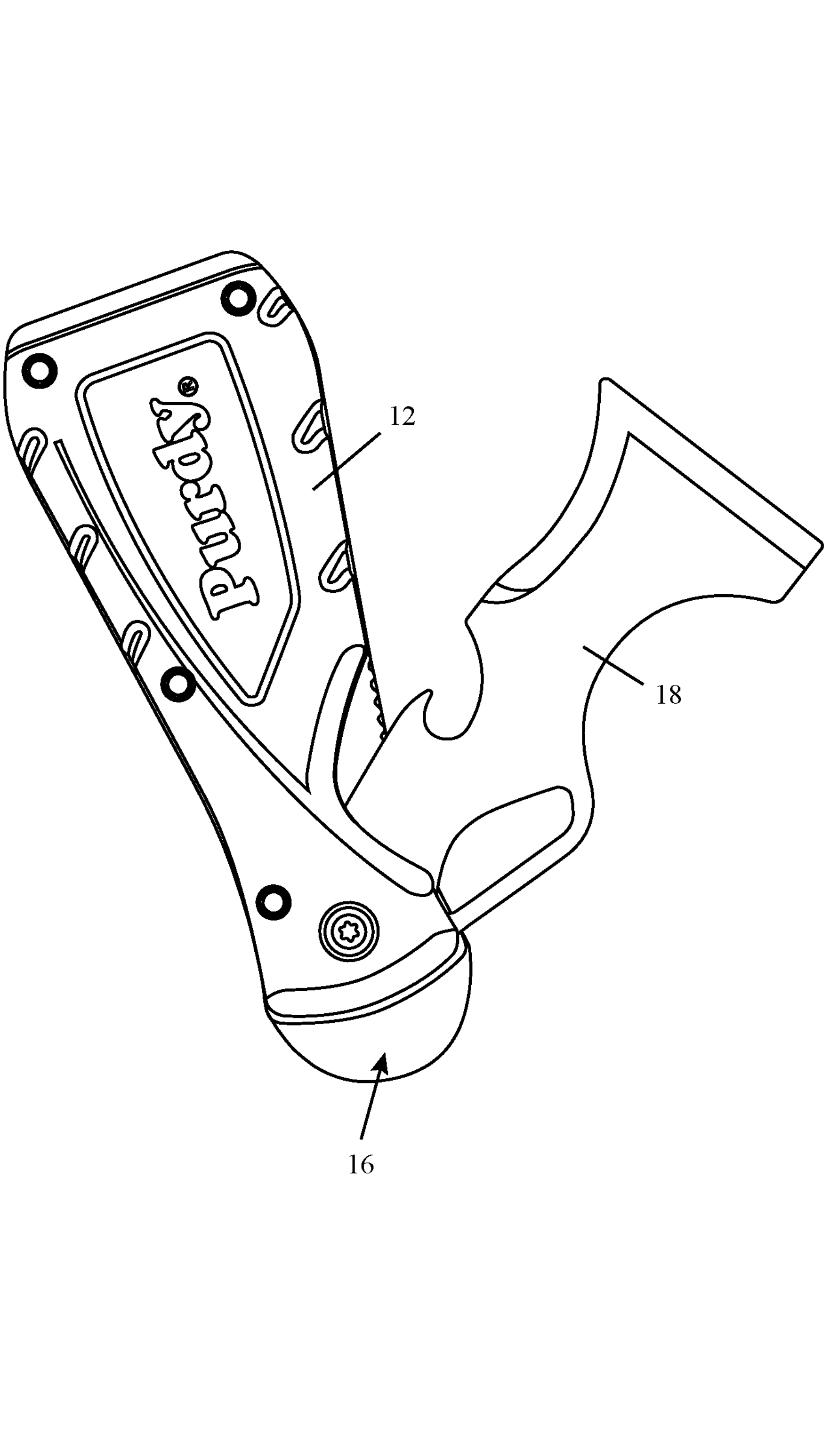
FIG. 29 is a perspective view of the folding tool with the blade in an intermediate position.

During use of the folding tool 10, to move the blade 18 from the closed position to the open position, the user moves the blade 18 via the loop 70 thereby causing the deflectable arm 20 to move to the second position and allowing the blade 18 to be swiveled or rotated about an axis perpendicular to the longitudinal axis. After the detent 160 has disengaged from the blade 18 when the detent 160 reaches the ramp 202, the blade 18 will be in an intermediate position as shown in FIG. 29, and the deflectable arm 20 will move to the intermediate position between the first and second positions. In an embodiment, an audible indication is provided indicating that the blade 18 has disengaged from the detent 160. The movement of the blade 18 is continued until the blade reaches the open position shown in FIG. 1 where the deflectable arm 20 moves to the first position where the free end 146 abuts the first end 170 of the blade 18 to lock the blade in the open position.

To move the blade 18 from the open position to the closed position, the deflectable arm 20 is moved to the second position and held in the second position by the user as the blade is rotated until it contacts the deflectable arm 20, which will be in the intermediate position. As rotation of the blade 18 continues, the detent 160 moves up the ramp 202 and then contacts the bottom surface 176 of the blade 18 moving the deflectable arm 20 to the second position. Once the blade reaches the closed positon the detent 160 will engage the indent 200 and the deflectable arm 20 will be in the intermediate position.

Figure 30:
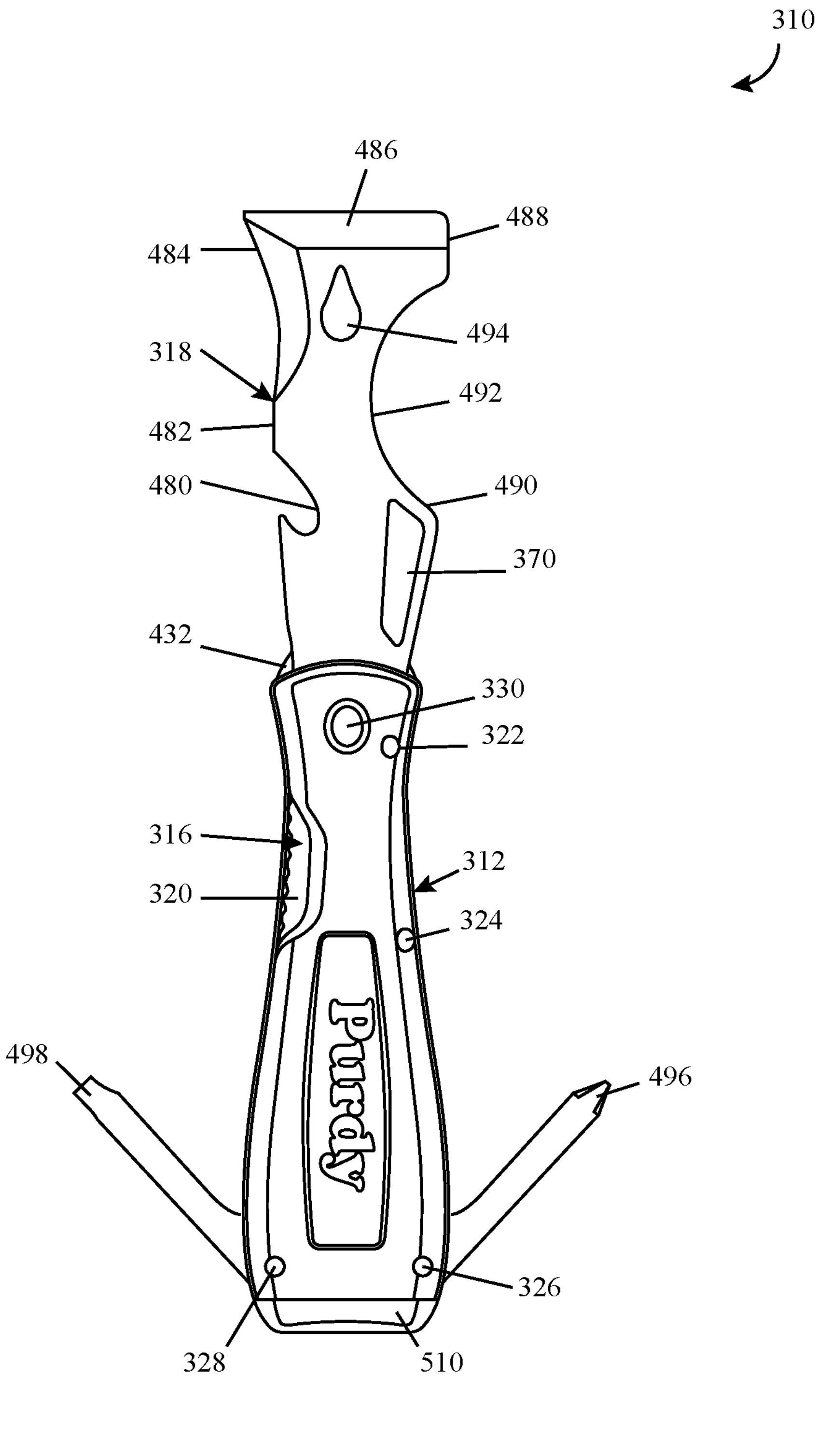
FIG. 30 is a front view of another folding tool in an open position.

Turning now to FIG. 30, an exemplary embodiment of the folding tool is shown at 310. The folding tool 310 is substantially the same as the above-referenced folding tool 10, and consequently the same reference numerals but indexed by 300 are used to denote structures corresponding to similar structures in the folding tools. In addition, the foregoing description of the folding tool 10 is equally applicable to the folding tool 310 except as noted below.

The folding tool 310 includes a top portion 312, a bottom portion (not shown), a lock plate 316, a blade 318, and a hammerhead 510. The lock plate 316 includes a deflectable arm 320 that is biased in a first position to prevent movement of the blade 318 from an open position as shown to a closed position when in the first position and to allow movement of the blade 318 when in a second position.

The top portion 312, bottom portion, and lock plate 316 may each include a plurality of openings for receiving rivets 322, 324, 326, and 328 to couple the components together, and each include an opening for receiving a pivot 330, which may be formed in any suitable manner.

The blade 318 includes a bottle opener 480 on a side 482, a cutter 484 on the side 482, a scraper and/or spreader 486, a paint can opener 488 on a side 490, a roller cleaner 492 on the side 490, a loop 370 inwardly spaced from the side 490, and a nail puller 494. The lock plate 316 includes a rounded portion 432 that can be used as a flathead screwdriver and/or as an opener. The folding tool 310 additionally includes one or more tool portions, and as illustrated first and second tool portions 496 and 498 that are movable from stored positions within the top and bottom portions to exposed positions, one of which is shown, allowing the tool portions to be used. The tool portions 496 and 498 may include openings that receive the rivets 326 and 328 respectively to secure the tool portions 496 and 498 and to serve as pivots. The tool portions 496 and 498 may be suitable tool portions, for example the tool portion 496 may be a Philips screwdriver and the tool portion 498 may be a flathead screwdriver.

Figure 31:
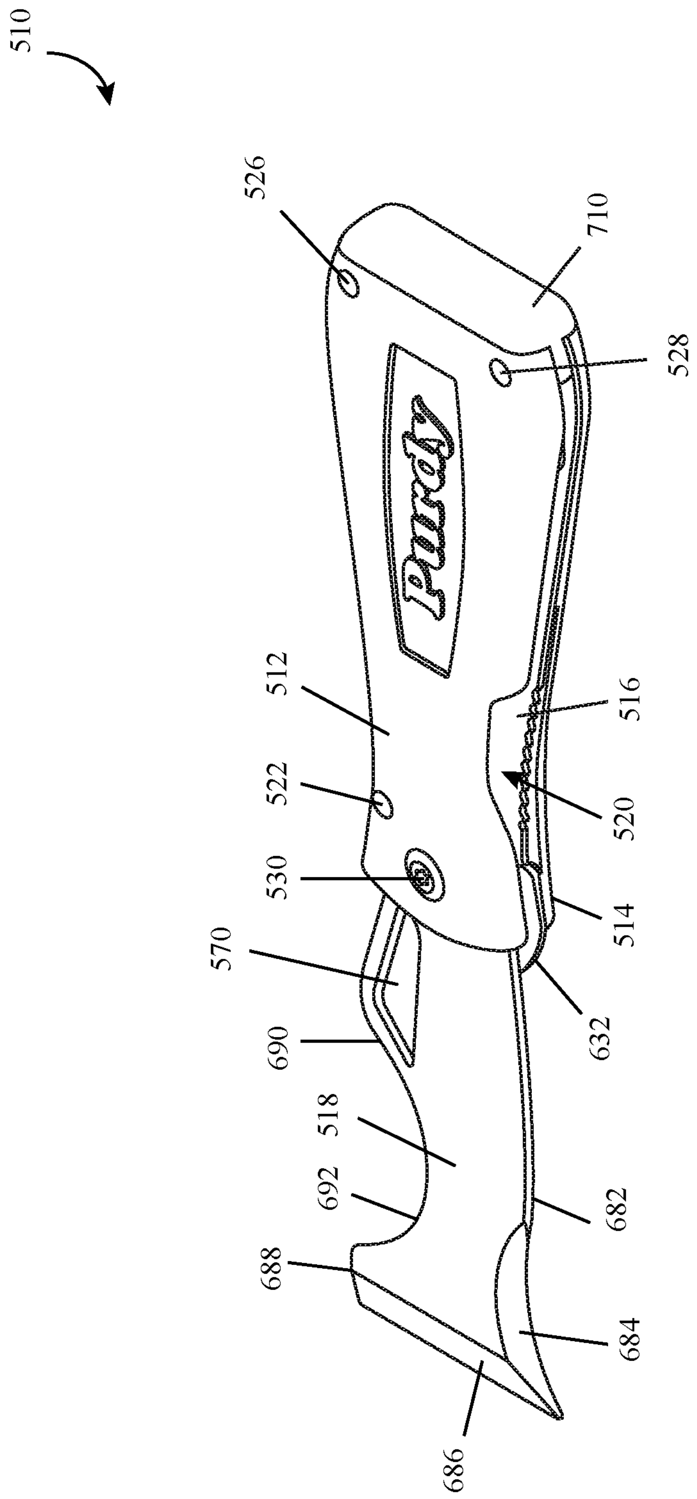
FIG. 31 is a perspective view of yet another folding tool in an open position.

Turning now to FIG. 31 an exemplary embodiment of the folding tool is shown at 510. The folding tool 510 is substantially the same as the above-referenced folding tool 10, and consequently the same reference numerals but indexed by 500 are used to denote structures corresponding to similar structures in the folding tools. In addition, the foregoing description of the folding tool 10 is equally applicable to the folding tool 510 except as noted below.

The folding tool 510 includes a top portion 512, a bottom portion 514, a lock plate 516, a blade 518, and a hammerhead 710. The lock plate 516 includes a deflectable arm 520 that is biased in a first position to prevent movement of the blade 518 from an open position as shown to a closed position when in the first position and to allow movement of the blade 518 when in a second position.

The top portion 512, bottom portion 514, and lock plate 516 may each include a plurality of openings for receiving rivets 522, 526, and 528 to couple the components together, and each include an opening for receiving a pivot 530, which may be formed in any suitable manner.

The blade 518 includes, a cutter 684 on a side 682, a scraper and/or spreader 686, a paint can opener 688 on a side 690, a roller cleaner 692 on the side 690, and a loop 570 inwardly spaced from the side 690. The lock plate 516 includes a rounded portion 632 that can be used as a flathead screwdriver and/or as an opener.

The aforementioned blades 18, 318, 518 may include suitable edges, such as a scraping edge, a beveled edge, a cutting edge, among others, and can be a shape having one or more edges, angles, curves, and the like to provide functionality. For instance, the blade can include one or more edges for scraping, removing of material (e.g., putty), cleaning (e.g., coating roller cleaning, paint roller cleaning, roller cleaning, etc.), enlarging or opening cracks (e.g., opening or enlarging cracks for patching, repair, touch-ups, etc.), applying a material (e.g., applying putty, etc.), among others. Features on one of the blades 18, 318, and 518 may be included on others.

The aforementioned elements (e.g., tool 10, top portion 12, bottom portion 14, lock plate 16, and blade 18, among others), and the like have been described with respect to interaction between several components and/or elements. It should be appreciated that such elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function;

and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A tool comprising:

a handle assembly including a top portion having first and second ends and a bottom portion having first and second ends;

a lock plate disposed between the top and bottom portions and having first and second ends, a deflectable arm having a free end biased towards the top portion, a fixed end opposite the free end, a detent near the free end, and a rounded tool portion at the first end of the lock plate that extends axially past an exterior face of the first ends of the top and bottom portions; and a blade disposed between the top portion and the lock plate, the blade having first and second ends, wherein the blade is rotatable about the first end of the blade between a closed position where the second end of the blade is held within the handle assembly, and an open position where the second end of the blade is outside the top and bottom portions overlapping the rounded tool portion and the first end of the blade is engaged by the free end of the deflectable arm to hold the blade in the open position.

2. The tool according to claim 1, further comprising a hammerhead extending past the second ends of the top and bottom portions and abutting end faces thereof.

3. The tool according to claim 1, wherein the blade includes a loop for a user to grab to move the blade from the closed position to the open position, and the top portion includes a notch extending inwardly from a side of the top portion to expose the deflectable arm and the loop.

4. The tool according to claim 3, wherein the blade includes a roller cleaner between the second end and the loop.

5. The tool according to claim 1, wherein the top and bottom portions are substantially trapezoidal in shape.

6. The tool according to claim 1, further comprising a clip coupled to the bottom portion.

7. The tool according to claim 1, wherein the lock plate includes a longitudinal axis and a substantially L-shaped cutout having a first portion extending axially and a second portion extending perpendicular to the axis, and wherein the cutout separates the lock plate into a body portion and the deflectable arm.

8. The tool according to claim 7, wherein the fixed end is integrally formed with the body portion, the free end is spaced from the body portion by the second portion of the cutout, and an inner edge of the deflectable arm is spaced from the body portion by the first portion of the cutout.

9. The tool according to claim 7, wherein the deflectable arm is biased towards the top portion such that the free end is above a plane of the body portion forming an incline.

10. The tool according to claim 1, wherein the blade includes an indent in a bottom surface thereof near the first end of the blade for engaging the detent in the closed position and a ramp on the bottom surface defining a reduced thickness portion of the blade that reduces in thickness from the indent towards an edge of the blade.

11. A tool comprising:

a handle assembly including a top portion and a bottom portion;

a lock plate disposed between the top and bottom portions and having a deflectable arm having a free end and a detent near the free end; and a blade having top and bottom surfaces, an indent in the bottom surface for engaging the detent, and a ramp on the bottom surface defining a reduced thickness portion of the blade that reduces in thickness from the indent towards an edge of the blade.

12. The tool according to claim 11, wherein the deflectable arm additionally includes an inner edge, an outer edge, an elongate opening near a fixed end and spaced from the inner and outer edges to form a pair of continuous regions of the deflectable arm around the elongate opening extending in a direction from the fixed end towards the free end.

13. The tool according to claim 12, wherein the elongate opening has an inner edge proximate and parallel to the inner edge of the deflectable arm and an outer edge proximate and parallel to the outer edge of the deflectable arm such that the continuous regions each maintain a substantially constant width in a direction from the inner edge of the deflectable arm to the outer edge of the deflectable arm.

14. The tool according to claim 11, wherein the lock plate includes a longitudinal axis and a substantially L-shaped cutout having a first portion extending axially and a second portion extending perpendicular to the axis, and wherein the cutout separates the lock plate into a body portion and the deflectable arm.

15. The tool according to claim 14, wherein a fixed end of the lock plate is integrally formed with the body portion, the free end is spaced from the body portion by the second portion of the cutout, and an inner edge of the deflectable arm is spaced from the body portion by the first portion of the cutout.

16. The tool according to claim 11, wherein the blade includes a loop for a user to grab to move the blade from a closed position to an open position, and the top portion includes a notch extending inwardly from a side of the top portion to expose the deflectable arm and the loop.

17. The tool according to claim 11, wherein the lock plate includes a tool portion at an end that extends axially past ends of the top and bottom portions.

18. A tool comprising:

a handle assembly including a top portion having first and second ends spaced along a longitudinal axis of the tool and a bottom portion having first and second ends spaced along the longitudinal axis of the tool;

a lock plate disposed between the top and bottom portions and having first and second ends spaced along the longitudinal axis of the tool, a deflectable arm having a free end biased towards the top portion, a fixed end opposite the free end, a detent near the free end, and a rounded tool portion at the first end of the lock plate that extends axially past an exterior face of the first ends of the top and bottom portions;

a hammerhead extending past the second ends of the top and bottom portions and abutting end faces thereof; and a blade disposed between the top portion and the lock plate, the blade having first and second ends spaced along a longitudinal axis of the tool, an indent in a bottom surface thereof near the first end for engaging the detent in a closed position, and a loop for a user to grab to move the blade from a closed position to an open position.

19. The tool according to claim 18, wherein the blade is rotatable about the first end of the blade between the closed position where the second end of the blade is held within the handle assembly, and the open position where the second end of the blade is outside the top and bottom portions overlapping the rounded tool portion and the first end of the blade is engaged by the free end of the deflectable arm to hold the blade in the open position.

* * * * *